(12) United States Patent
Yi et al.

(10) Patent No.: US 8,753,437 B2
(45) Date of Patent: Jun. 17, 2014

(54) DRY CARBON DIOXIDE CAPTURING DEVICE WITH IMPROVED ENERGY EFFICIENCY

(71) Applicant: Korea Institute of Energy Research, Daejeon (KR)

(72) Inventors: Chang-Keun Yi, Daejeon (KR); Young Cheol Park, Daejeon (KR); Sung-Ho Jo, Daejeon (KR); Gyoung Tae Jin, Daejeon (KR); Dowon Shun, Daejeon (KR); Dal-Hee Bae, Daejeon (KR); Jaehyeon Park, Daejeon (KR); Ho-Jung Ryu, Daejeon (KR); Seung-Yong Lee, Daejeon (KR); Jong-Ho Moon, Seoul (KR); Dong-Ho Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 55 days.

(21) Appl. No.: 13/649,600

(22) Filed: Oct. 11, 2012

(65) Prior Publication Data

US 2013/0087047 A1    Apr. 11, 2013

(30) Foreign Application Priority Data

Oct. 11, 2011    (KR) .................. 10-2011-0103686

(51) Int. Cl.
*B01D 53/02* (2006.01)
*B01D 53/10* (2006.01)
*B01D 53/62* (2006.01)
*B01D 53/14* (2006.01)

(52) U.S. Cl.
CPC .............. *B01D 53/10* (2013.01); *B01D 52/12* (2013.01); *B01D 53/62* (2013.01); *B01D 53/1475* (2013.01); *B01D 2257/504* (2013.01); *B01D 2259/4009* (2013.01); *Y02C 10/06* (2013.01); *Y02C 10/08* (2013.01)
USPC ................... 96/150; 96/122; 96/123; 96/146; 95/107; 95/108; 95/139; 423/230

(58) Field of Classification Search
CPC ............. B01D 53/10; B01D 2257/504; B01D 2259/4009; Y02C 10/06
USPC .............. 95/107–112, 139; 96/122, 123, 146, 96/150; 423/230–233
See application file for complete search history.

(56) References Cited

U.S. PATENT DOCUMENTS 4,224,041 A * 9/1980 Noack et al. ..................... 96/146
4,409,102 A * 10/1983 Tanner .......................... 210/603

(Continued)

*Primary Examiner* — Christopher P Jones
(74) *Attorney, Agent, or Firm* — Baker & Hostetler LLP

(57) ABSTRACT

Disclosed is a dry $CO_2$ capturing device with improved energy efficiency, which utilizes a difference in temperature between a regeneration operation of isolating $CO_2$ from an sorbent containing $CO_2$ absorbed therein and a pre-treatment operation of allowing $H_2O$ to be adsorbed to $CO_2$. The dry carbon dioxide ($CO_2$) capturing device, includes a recovery reactor for recovering $CO_2$, a recovery cyclone for discharging a gas while separating the $CO_2$-captured solid sorbent only, a regenerator for receiving the $CO_2$-captured solid sorbent and separating $CO_2$ captured in the solid sorbent, and a pre-treatment reactor for cooling the solid sorbent free from $CO_2$, wherein a first heat exchanger is provided between the recovery cyclone and the regenerator to pass the $CO_2$-captured solid sorbent therethrough, and a second heat exchanger is provided between the pre-treatment reactor and the regenerator to pass the solid sorbent free from $CO_2$ therethrough. The first and second heat exchanger include a first and second heat exchange jacket mounted thereon which are connected to each other in a closed loop state.

4 Claims, 1 Drawing Sheet

(56) References Cited

U.S. PATENT DOCUMENTS

| | | | |
|---|---|---|---|
| 4,539,188 A * | 9/1985 | Hirsch et al. | 423/210 |
| 5,304,234 A * | 4/1994 | Takatsuka et al. | 95/106 |
| 6,030,591 A * | 2/2000 | Tom et al. | 423/240 S |
| 6,251,164 B1 * | 6/2001 | Notaro et al. | 95/99 |
| 6,387,337 B1 * | 5/2002 | Pennline et al. | 423/220 |
| 2002/0023538 A1 * | 2/2002 | Agarwal et al. | 95/108 |
| 2009/0025390 A1 * | 1/2009 | Christensen et al. | 60/670 |
| 2010/0086456 A1 * | 4/2010 | Epple | 423/230 |
| 2010/0172810 A1 * | 7/2010 | Yi et al. | 422/292 |
| 2013/0047573 A1 * | 2/2013 | Mishra | 60/39.12 |

* cited by examiner

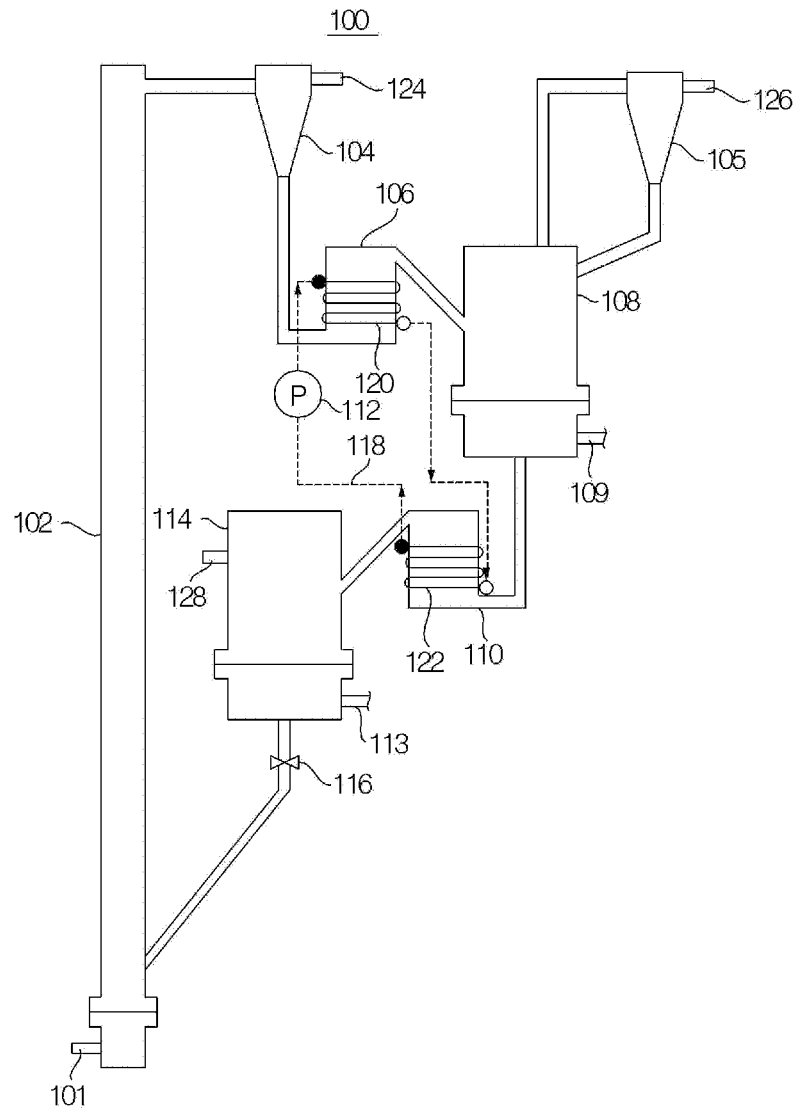

DRY CARBON DIOXIDE CAPTURING DEVICE WITH IMPROVED ENERGY EFFICIENCY

RELATED APPLICATIONS

This application claims priority from Korean Patent Application No. 10-20110103686, filed on Oct. 11, 2011 in the Korean Intellectual Property Office, the entire disclosure of which is incorporated herein by reference.

BACKGROUND OF THE INVENTION

1. Field of the Invention

The present invention relates to a dry carbon dioxide capturing apparatus, and more particularly, to a dry carbon dioxide ($CO_2$) capturing device with improved energy efficiency, which includes utilizing a difference in temperature between separation of $CO_2$ from an sorbent containing $CO_2$ absorbed therein to regenerate the same (that is, $CO_2$) and pre-treatment of allowing a recovery reactor to be in desired conditions such as proper temperature to regenerate $CO_2$, to thereby achieve improvement of energy efficiency.

2. Description of the Related Art

A carbon dioxide capture apparatus in related art generally employs a wet process to recover $CO_2$. That is, the wet process is carried out by passing $CO_2$-containing gas through an amine solution, to allow $CO_2$ to be absorbed into the solution and regenerating the solution in a regeneration column, thus reusing the solution. However, the wet process has a demerit of further creating waste water during operation of the wet process.

In order to overcome disadvantages of the wet process in the art, a dry process for $CO_2$ recovery has been proposed. This method is to recover $CO_2$ by a dry processing system using two reactors, wherein $CO_2$ fed into a recovery reactor is adsorbed to a solid sorbent (a dry sorbent) and removed. The solid sorbent inflows into a regeneration reactor ('regenerator') to remove the adsorbed $CO_2$, $H_2O$ is adsorbed to the solid sorbent in a pre-treatment reactor, and then the sorbent is recycled in a recovery reactor.

In this regard, in order to remove $CO_2$ from the regenerator, an alternative heat source should be supplied. Also, the pre-treatment reactor must remove heat from the solid sorbent to ensure a temperature condition suitable to adsorb $CO_2$ in the regenerator.

In related art, since a dry $CO_2$ capturing device is commonly mounted in large-scale plants such as a power plant to generate $CO_2$ in large quantities, steam generated in the power plant is generally used as a heat supplying medium while another medium for cooling may usually be water which is widely abundant.

However, the dry $CO_2$ capturing device consumes a significant amount of calories, if the water with a highly elevated temperature in a large capacity plant after cooling is directly discharged to the outside, thermal contamination of water cannot be avoided due to adverse effects of hot waste water, which in turn has a negative influence upon aquatic species.

SUMMARY OF THE INVENTION

Accordingly, it is an object of the present invention to provide a dry $CO_2$ capturing device with improved energy efficiency, which utilizes a difference in temperature between a regeneration operation of isolating $CO_2$ from an sorbent containing $CO_2$ absorbed therein and a pre-treatment operation of allowing $H_2O$ to be adsorbed to $CO_2$, to transfer calories absorbed in the pre-treatment operation to the regeneration operation, thereby improving energy efficiency.

In order to accomplish the above objects, there is provided a dry carbon dioxide ($CO_2$) capturing device, comprising: a recovery reactor to recover $CO_2$ by contacting a solid sorbent with exhaust gas, which is fed from outside and contains $CO_2$; a recovery cyclone connected to the recovery reactor to discharge a gas while separating the solid sorbent capturing $CO_2$ ('$CO_2$-captured solid sorbent') only; a regenerator connected to the recovery cyclone to receive the $CO_2$-captured solid sorbent and separate $CO_2$ captured in the solid sorbent through a fluidized gas; and a pre-treatment reactor connected to the regenerator to cool the solid sorbent free from $CO_2$ and feedback the cooled solid sorbent to the recovery reactor, wherein a first heat exchanger is provided between the recovery cyclone and the regenerator to pass the $CO_2$-captured solid sorbent therethrough, and a second heat exchanger is provided between the pre-treatment reactor and the regenerator to pass the solid sorbent free from $CO_2$ therethrough, and wherein the first and second heat exchanger include a first and second heat exchange jacket mounted thereon, respectively, which are connected to each other through a loop pipe to form a closed loop enabling a heat transfer medium to flow therein.

The heat transfer medium may be liquefied in the first heat exchange jacket while being vaporized in the second heat exchange jacket.

Preferably, the first heat exchanger is located at a higher position than the second heat exchanger.

Preferably, the first heat exchanger and the second heat exchanger further include a circulation pump provided therebetween to circulate the heat transfer medium.

According to the present invention, energy efficiency of the dry $CO_2$ capturing device may be enhanced while damage of thermal contamination caused in $CO_2$ capturing process may be successfully decreased.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a schematic view illustrating a dry $CO_2$ capturing device according to one embodiment of the present invention.

DETAILED DESCRIPTION OF THE INVENTION

The present invention will now be described more fully hereinafter with reference to the accompanying drawing.

Referring to FIG. 1, reference numeral 100 denotes a dry $CO_2$ capturing device. The dry $CO_2$ capturing device 100 generally includes a recovery reactor 102, a recovery cyclone 104, a regenerator 108 and a pre-treatment reactor 114, which are commonly known in the art.

The recovery reactor 102 may be a fixed bed reactor, a fluidized bed reactor or a recovery reactor typically used in other commonly known dry $CO_2$ capturing devices. Specifically, in the case of using the fluidized bed reactor, a dry solid sorbent is fluidized by exhaust gas, therefore, the exhaust gas in a gas state may actively contact a solid sorbent in a solid state to improve $CO_2$ removal efficacy, thereby being preferable.

The dry solid sorbent used in the present invention may include any one generally used in the art, and in particular, $K_2CO_2$ or $Na_2CO_3$ having favorable $CO_2$ adsorption is preferably used.

The exhaust gas is fed through an exhaust gas supply line 101 into the recovery reactor 102, and in the case of using the fluidized bed reactor, fluidization of the solid sorbent must be retained by controlling injection pressure and flow rate of the exhaust gas. Also, the exhaust gas should be introduced at an injection temperature T1 wherein the dry solid sorbent actively absorbs $CO_2$. Such an injection temperature T1 may be varied depending upon species of the dry solid sorbent.

The recovery cyclone 104 may be an apparatus commonly known in the art, wherein the solid sorbent containing $CO_2$ absorbed therein ('$CO_2$-absorbed solid sorbent') is centrifuged to cause the solid sorbent to fall down by self-weight while light gas, that is, the exhaust gas free from $CO_2$ may flow through an isolated gas discharge line 124 connected to the recovery cyclone 104 to further operations.

The regenerator 108 may heat the $CO_2$-absorbed solid sorbent to allow the solid sorbent to release $CO_2$. Herein, a heating temperature T2 of the solid sorbent may be higher than the injection temperature T1 of the exhaust gas. Heating the solid sorbent in the regenerator 108 may be done in a fluidized state by the regenerated gas Mowing from a regenerated gas supply line 109 wherein the regenerated gas may be steam. When using steam as the regenerated gas, removing moisture only from the regenerated gas may preferably provide pure $CO_2$. Further, a diffusion plate to diffuse steam to hence perform fluidization of the solid sorbent is mounted inside the regenerator 108, and the solid sorbent is placed above the diffusion plate while the regenerated gas supply line 109 may be connected to a bottom of the diffusion plate. The diffusion plate may be provided with a solid sorbent delivery line, which passes through the diffusion plate to transport the solid sorbent to the pre-treatment reactor 114.

The regenerator 108 may further be provided with a regeneration cyclone 105 to prevent loss of the solid sorbent suspended by the regenerated gas. The regeneration cyclone 105 may substantially have the same structure as that of the recovery cyclone 104. The top end portion of the regenerator 108 is connected to a $CO_2$ discharge line 126 to discharge a gas absorbed to the solid sorbent, i.e., $CO_2$ therethrough.

The solid sorbent passed through the regenerator 108 may have a temperature, at which $CO_2$ is easily absorbed in the pre-treatment reactor 114, and then, may move to the recovery reactor 102.

In order to cool the solid sorbent in the pre-treatment reactor 114, a pre-treatment gas may be supplied to the pre-treatment reactor 114. Such a pre-treatment gas may include, for example, air or inert gas such as nitrogen and be supplied through the pre-treatment gas supply line 109. A temperature of the pre-treatment gas should be at least equal to or less than the injection temperature of the exhaust gas fed to the recovery reactor 102. In addition, the pre-treatment gas may rapidly cool the solid sorbent by fluidized bed motion of the solid sorbent in the pre-treatment reactor 114.

In addition, the dry solid sorbent containing $H_2O$ absorbed therein has a characteristic wherein $CO_2$ is easily soluble in $H_2O$, and may hence increase $CO_2$ sorption rate. Accordingly, it is preferable to supply the pre-treatment gas in a saturated water vapor state so as to early moisturize the solid sorbent.

The pre-treatment reactor 114 may be connected to the pre-treatment gas discharge line 128 to discharge the pre-treatment gas fed to the pre-treatment reactor 114. In order to prevent the solid sorbent, which passes through the pre-treatment gas discharge line 128, from releasing therefrom, a pre-treatment cyclone (not shown) with the same construction as that of the regeneration cyclone 105 may be mounted on the pre-treatment gas discharge line 128. Accordingly, the solid sorbent recovered by the pre-treatment cyclone is fed back again to the pre-treatment reactor 114, while the pre-treatment gas with absorbed thermal energy only may be exhausted from the solid sorbent.

The solid sorbent discharged from the pre-treatment reactor 114 by contacting the pre-treatment gas with the solid sorbent has a temperature substantially identical to the injection temperature T1 of the recovery reactor 102. For this reason, the regenerated gas in the regenerator 108 may elevate the temperature of the solid sorbent up to the heating temperature T2 in the regenerator 108, whereas the pre-treatment reactor 114 must decrease the temperature of the solid sorbent down to the injection temperature T1. Accordingly, thermal energy supplied to the regenerator 108 must forcedly recover the same in further operation using the pre-treatment reactor 114.

Therefore, according to the present invention, a first heat exchanger 106, through which the solid sorbent capturing $CO_2$ ('$CO_2$-captured solid sorbent') passes, may be located between the recovery cyclone 104 and the regenerator 108, and a second heat exchanger 110, through which the solid sorbent free from $CO_2$ passes, may be placed between the regenerator 108 and the pre-treatment reactor 114.

In addition, the first heat exchanger 106 and second heat exchanger 110 may have a first and second heat exchange jackets 120 and 122, respectively, wherein these heat exchange jackets 120 and 122 are connected with each other through a loop pipe 118 and a heat transfer medium may circulate inside the jackets in a closed loop state.

As a result, heat absorbed from the second heat exchanger 110 through the second heat exchange jacket 122 is given to the first heat exchange jacket 120, hence being transferred to the first heat exchanger 106. In other words, since the solid sorbent inflowing to the first heat exchanger 106 passes through the recovery reactor 102 and the recovery cyclone 104 to have a temperature T1 while the solid sorbent inflowing to the second heat exchanger 110 has a temperature T2, a difference in temperature of (T2-T1) may occur between the second heat exchanger 110 and the first heat exchanger 106. Accordingly, if the heat absorbed by the second heat exchange jacket 122 from the second heat exchanger 110 is given to the first heat exchanger 106 through the first heat exchange jacket 120, the temperature of the solid sorbent inflowing to the regenerator 108 may become higher than T1 and hence decrease the required calories of steam. Additionally, since the temperature of the solid sorbent inflowing to the pre-treatment reactor 114 may be reduced below T2, absorbed calories obtained from the solid sorbent may be decreased by the pre-treatment gas fed to the pre-treatment reactor 114, compared to the related art.

Furthermore, as described above, the first and second heat exchange jackets 120 and 122 together may form a closed loop, and a heat transfer medium may circulate inside the jackets in the closed loop state.

Circulation of the heat transfer medium may be performed by mounting a circulating pump 112 in the closed loop, as schematically illustrated in FIG. 1.

Also, using a difference in density of a heat transfer medium caused by phase change may possibly circulate the heat transfer medium in the closed loop without supplying any external energy. That is, the heat transfer medium vaporized and reduced in weight in the second heat exchange jacket 122 at a high temperature may become liquid in the first heat exchange jacket 120 at a low temperature, thus having increased density. When the density is increased, self-weight may also be increased and hence the heat transfer medium may circulate inside the loop pipe 118. In this case, in order that the heat transfer medium is liquefied in the first heat exchange jacket 120 while being vaporized in the second heat exchange jacket 122, a vaporizing temperature must be present between T1 and T2. Such a heat transfer medium may be water having a high heat capacity or be any one among other heat transfer media commonly known in the art. In addition, in order to allow the vaporizing temperature of the heat transfer medium to satisfy the above requirements, an internal pressure of the loop pipe 118 is possibly adjusted. Moreover, a check valve (not shown) may be mounted in the loop pipe 118 to restrict circulation of the heat transfer medium in one direction.

Further, in order to easily circulate the heat transfer medium, the first heat exchanger 106 is preferably located at the higher position than the second heat exchanger 110.

Although preferred embodiments of the present invention have been described for illustrative purposes, those skilled in the art will appreciate that various alterations and modification are possible, without departing from the scope and spirit of the present invention as disclosed in the appended claims.

What is claimed is:

1. A dry carbon dioxide ($CO_2$) capturing device, comprising:
   a recovery reactor to recover $CO_2$ by contacting a solid sorbent with exhaust gas, which is fed from outside and contains $CO_2$;
   a recovery cyclone connected to the recovery reactor to discharge a gas while separating the solid sorbent capturing $CO_2$ ('$CO_2$-captured solid sorbent') only;
   a regenerator connected to the recovery cyclone to receive the $CO_2$-captured solid sorbent and separate $CO_2$ captured in the solid sorbent through a fluidized gas; and
   a pre-treatment reactor connected to the regenerator to cool the solid sorbent free from $CO_2$ and feedback the cooled solid sorbent to the recovery reactor,
   wherein a first heat exchanger is provided between the recovery cyclone and the regenerator to pass the $CO_2$-captured solid sorbent therethrough, and a second heat exchanger is provided between the pre-treatment reactor and the regenerator to pass the solid sorbent free from $CO_2$ therethrough, and
   wherein the first and second heat exchanger include a first and second heat exchange jacket mounted thereon, respectively, which are connected to each other through a loop pipe to form a closed loop enabling a heat transfer medium to flow therein.

2. The device according to claim 1, wherein the heat transfer medium is liquefied in the first heat exchange jacket while being vaporized in the second heat exchange jacket.

3. The device according to claim 2, wherein the first heat exchanger is located at a higher position than the second heat exchanger.

4. The device according to claim 1, wherein the first heat exchanger and the second heat exchanger further include a circulation pump provided therebetween to circulate the heat transfer medium.

* * * * *